United States Patent [19]

Vu et al.

[11] Patent Number: 4,946,002
[45] Date of Patent: Aug. 7, 1990

[54] HOOD BUMPER PROTECTOR

[76] Inventors: Thuan D. Vu, 323 18th St., Brooklyn, N.Y. 11215; George Spector, 233 Broadway Suite 3815, New York, N.Y. 10007

[21] Appl. No.: 330,830
[22] Filed: Mar. 30, 1989
[51] Int. Cl.⁵ .................. B60R 19/38; B60R 21/02
[52] U.S. Cl. .................. 180/271; 293/24; 293/118
[58] Field of Search ............ 293/5, 9, 10, 24, 118; 180/271, 274, 282, 770

[56] References Cited

U.S. PATENT DOCUMENTS 3,677,595  7/1972  Hamilton .................. 293/24
3,829,140  8/1974  Jehu et al. .................. 180/274

FOREIGN PATENT DOCUMENTS 2841315  4/1980  Fed. Rep. of Germany ...... 180/274
2443945  8/1980  France .................. 293/118
52-33234  3/1977  Japan .................. 180/274

Primary Examiner—Charles A. Marmor
Assistant Examiner—Karin Tyson

[57] ABSTRACT

A hood bumper protector is provided and consists of a bumper member which can be raised to an operative position by a hydraulic mechanism activated by the brake pedal to protect the hood and windshield of the motor vehicle from damage caused by a collision into another object such as a trailer truck.

4 Claims, 2 Drawing Sheets

HOOD BUMPER PROTECTOR

BACKGROUND OF THE INVENTION

The instant invention relates generally to safety devices for motor vehicles and more specifically it relates to a hood bumper protector.

Numerous safety devices for motor vehicles have been provided in prior art that are adapted to protect pedestrians and the motor vehicles. For example, U.S. Pat. Nos. 1,865,014; 3,829,140 and 3,905,629 all are illustrative of such prior art. While these units may be suitable for the particular purpose to which they address, they would not be as suitable for the purposes of the present invention as heretofore described.

SUMMARY OF THE INVENTION

A primary object of the present invention is to provide a hood bumper protector that will overcome the shortcomings of the prior art devices.

Another object is to provide a hood bumper protector which when activated by brake pedal will keep a driver safe and avoid a windshield crash when an accident happens between the motor vehicle and a trailer truck.

An additional object is to provide a hood bumper protector which will remain in a raised operative position above the front hood of the motor vehicle after release of the brake pedal until manually released so as to prevent further damage to the motor vehicle after the accident but before removal of the motor vehicle from against the trailer truck.

A further object is to provide a hood bumper protector that is simple and easy to use.

A still further object is to provide a hood bumper protector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
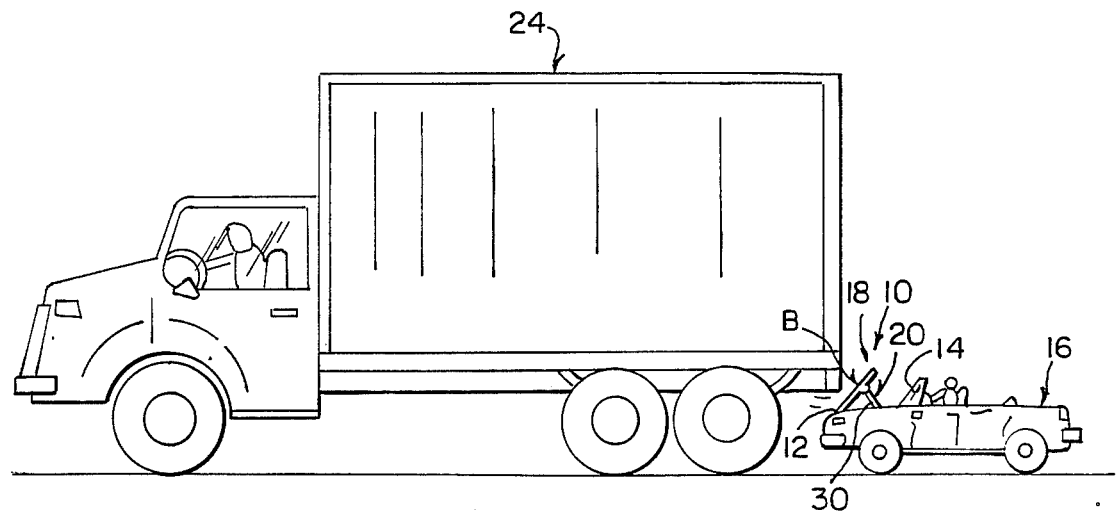
FIG. 1 is a side view of a motor vehicle hitting a rear portion of a trailer truck with bumper member in raised operative position.
Figure 2:
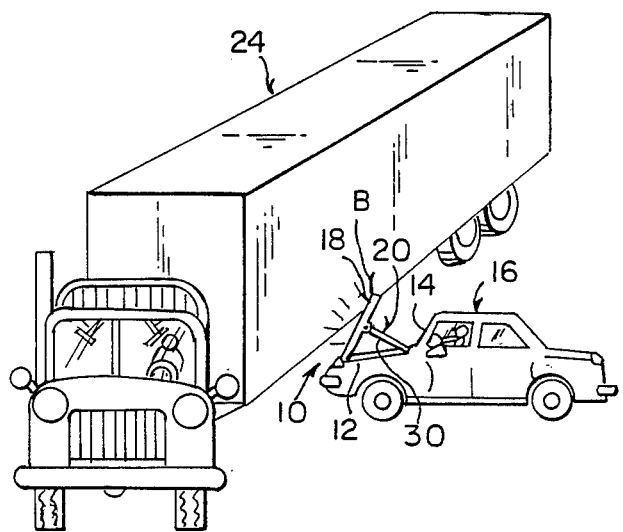
FIG. 2 is a side view of a motor vehicle hitting a side portion of a trailer truck with bumper member in the raised operative position.
Figure 3:
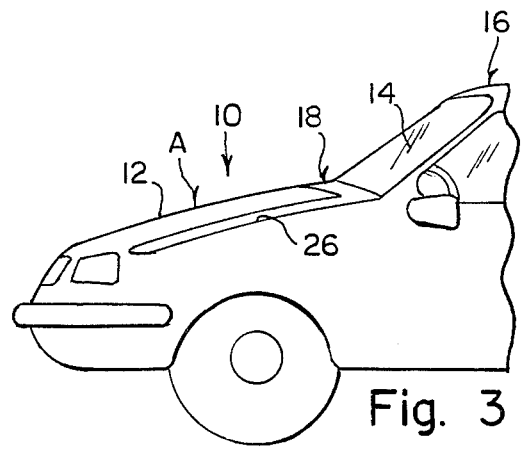
FIG. 3 is a perspective view of the motor vehicle with parts broken away and the bumper member in retracted stowed position.
Figure 4:
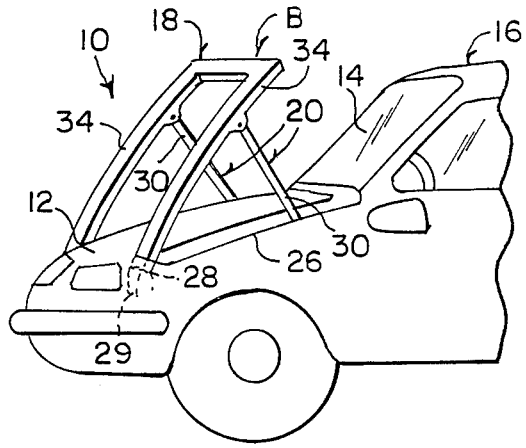
FIG. 4 is a perspective view similar to FIG. 3 with bumper member in the raised operative position.
Figure 5:
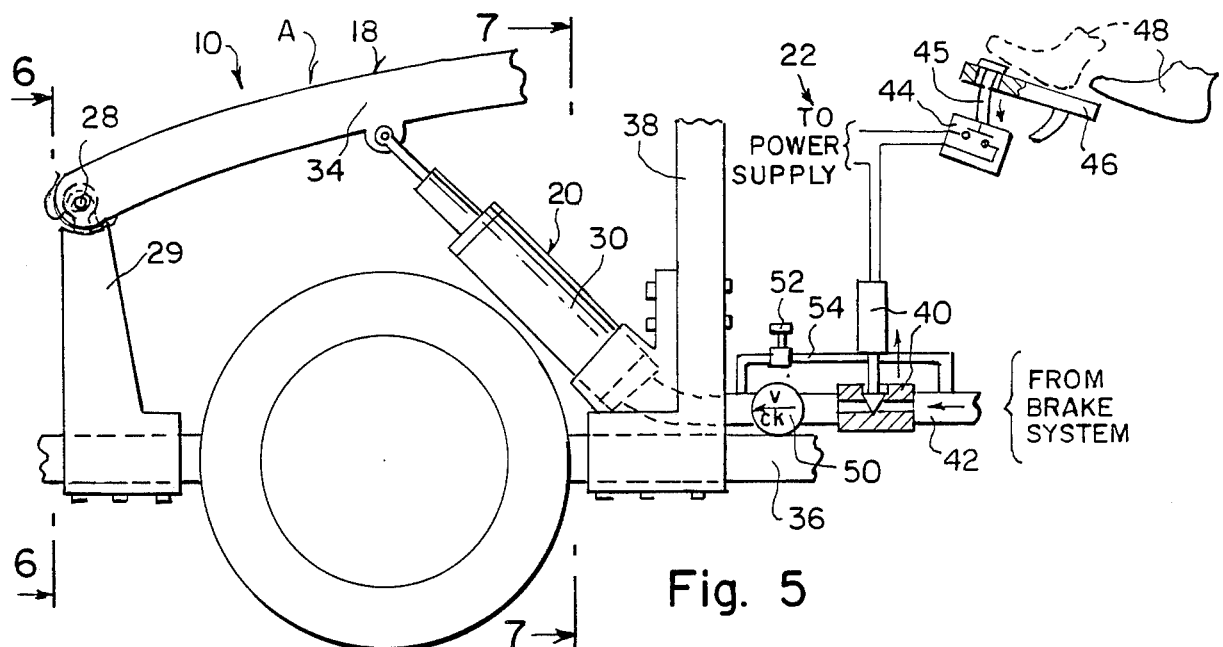
FIG. 5 is a side view of details of the invention with parts broken away and in section showing that actuation of the brake pedal will raise the bumper member to its operative position.
Figure 6:
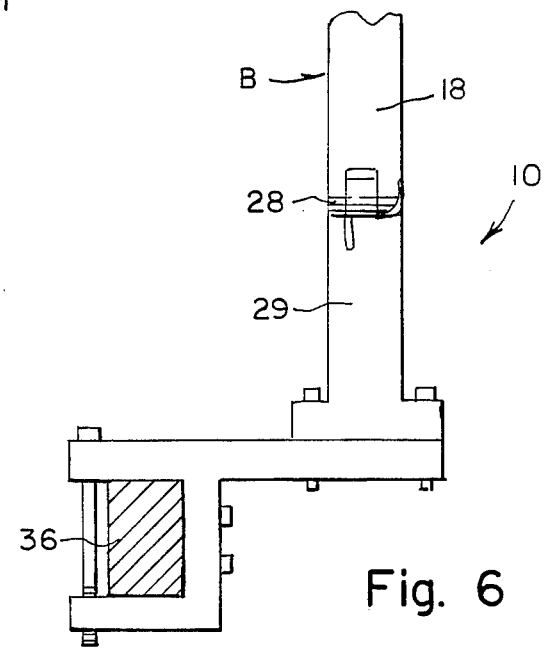
FIG. 6 is a cross sectional view taken along line 6—6 in FIG. 5 showing one of the front support members for the bumper member.
Figure 7:
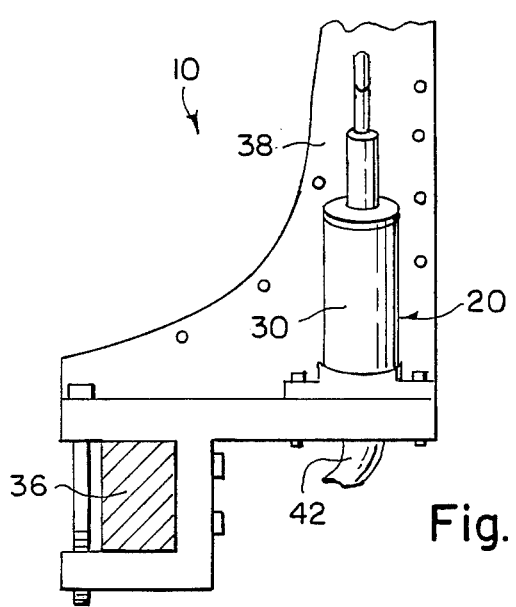
FIG. 7 is a cross sectional view taken along line 7—7 in FIG. 5 showing one of the rear support members for one of the hydraulic pistons.

Turning now descriptively to the drawings, in which similar reference characters denote similar elements throughout the several views, the figures illustrate a device 10 for protecting a hood 12 and windshield 14 of a motor vehicle 16. The device 10 includes a bumper member 18 and actuator 20 for moving the bumper member 18 from a retracted stowed position "A" into a raised operative position "B". A mechanism 22 is provided for actuating the actuator 20 before a collision takes place between the motor vehicle 16 and another object 24, such as a trailer truck. The bumper member 18 will go from its stowed position "A" to its operative position "B" to protect the hood 12 and windshield 14 of the motor vehicle 16 from damage caused by the collision.

The hood 12 of the motor vehicle 16 has a inverted U-shaped recess 26 therein. The bumper member 18 is substantially U-shaped in which a pivot point 28 is formed at each extremity of the "U" onto a front support member 29 so that the bumper member 18 can be received within the recess 26 and be pivotable by the actuator 20 about the pivot points 28 to move freely through the hood from its stowed position "A" to its operative position "B".

The actuator 20 includes a pair of normally spring biased to the retracted position hydraulic pistons 30, each of which is connected between one side 34 of the bumper member 18 and the chassis 36 of the motor vehicle 16 via support member 38 so as to lift the sides 34 of the bumper member 18 simultaneously to the raised operative position "B".

The actuating mechanism 22 includes a solenoid actuated valve 40 which is spring biased to the closed position, connected in a hydraulic line 42 bewteen the hydraulic pistons 30 and the brake system of the motor vehicle 16. A switch 44 having a lever 45 slideably connected to the normal brake pedal 46 of the motor vehicle 16 and is electrically connected between the solenoid actuated valve 40 and the power supply (battery) of the motor vehicle. The lever 45 of the switch 44 can be activated when foot 48 of the driver of the motor vehicle shown in dotted lines depresses both the brake pedal 46 and lever 45 opening the solenoid actuated valve 40 and causing the hydraulic pistons 30 to place the bumper member 18 into the raised operative position "B". The spring returning the solenoid actuated valve 40 to the closed position is slow acting so as to permit return flow of brake fluid when the brake pedal is released allowing the bumper member to retract. A safety check valve 50 is connected in the hydraulic line 42 between the solenoid actuated valve 40 and the hydraulic pistons 30 so as to hold pressure in the hydraulic line 42 and keep the bumper member 18 in the raised operative position "B" when the foot 48 of the driver is lifted off the brake pedal 46 and switch lever 45 after the collision to prevent additional damage to the motor vehicle 16 before separation from the other object 24. The check valve 50 ensures retention of the bumper member in the operative upright position, if there is back flow leakage through the solenoid actuated valve 40.

A manually operated valve 52 is connected in the hydraulic line 42 to bypass the check valve 50 and the solenoid actuated valve 40 via pipe 54 so as to release pressure in the hydraulic line 42 and lower the bumper member 18 back into the stowed position "A".

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A device for protecting a hood and windshield of a motor vehicle which comprises:
   (a) a bumper member;
   (b) an actuator for moving said bumper member from a retracted stowed position into a raised operative position;
   (c) means for actuating said actuator before a collision takes place between the motor vehicle and another object so that said bumper member will go from its stowed position to its operative position to protect the hood and windshield of the motor vehicle from damage caused by the collision;
   (d) the hood of the motor vehicle having an inverted U-shaped recess therein and
   (e) said bumper member being substantially U-shaped in which a pivot point is formed at each extremity of said "U" so that said bumper member can be received within said recess and be pivotable by said actuator about said pivot points to move freely through the hood from its stowed position to its operative position.

2. A device as recited in claim 1, wherein said actuator includes a pair of normally spring biased to the retracted position hydraulic pistons, each of which is connected between, one side of said bumper member and chassis of the motor vehicle so as to lift the sides of said bumper member simultaneously to the raised operative position.

3. A device as recited in claim 2, wherein said actuating means includes:
   (a) a solenoid actuated valve which is spring biased to the closed position connected in hydraulic line between said hydraulic pistons and the brake system of the motor vehicle and
   (b) a switch having a lever slideably connected to the normal brake pedal of the motor vehicle and electrically connected between said solenoid actuated valve and the power supply of the motor vehicle so that said lever of said switch can be activated when foot of driver of the motor vehicle depresses both the brake pedal and said lever opening said solenoid actuated valve and causing said hydraulic pistons to place said bumper member into the raised operative position, whereby the spring returning said solenoid actuated valve to the closed position is slow acting so as to permit return flow of brake fluid when the brake pedal is released allowing said bumper member to retract.

4. A device as recited in claim 3, wherein said actuating means further includes:
   (a) a safety check valve connected in the hydraulic line between said solenoid actuated valve and said hydraulic pistons so as to hold pressure in the hydraulic line and keep said bumper member in the raised operative position when the foot of the driver is lifted off the brake pedal and said switch lever after the collision to prevent additional damage to the motor vehicle before separation form the other object, whereby said check valve ensures retention of said bumper member in the operative upright position if there is back flow leakage through said solenoid actuated valve and
   (b) a manually operated valve connected in the hydraulic line to bypass said check valve and said solenoid actuated valve so as to release pressure in the hydraulic line and lower said bumper member back into the stowed position.

* * * * *